Jan. 15, 1963  E. SIEWERT  3,073,615
COLLAPSIBLE TRAILER
Filed Sept. 18, 1961  2 Sheets-Sheet 1
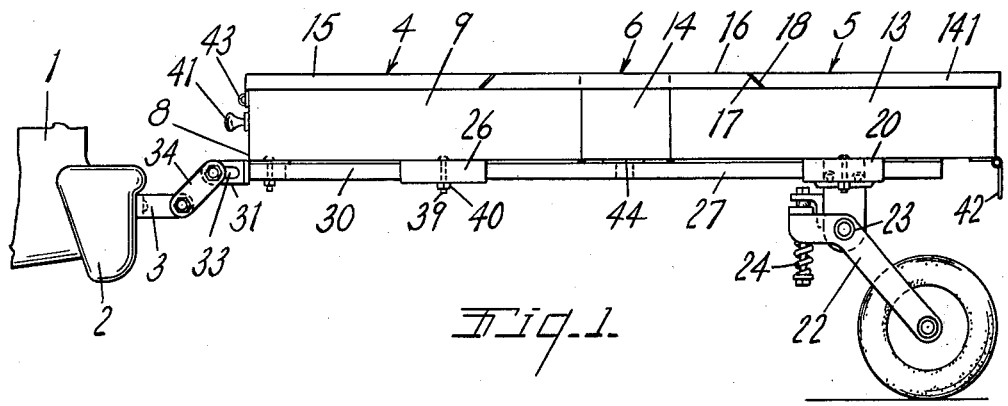
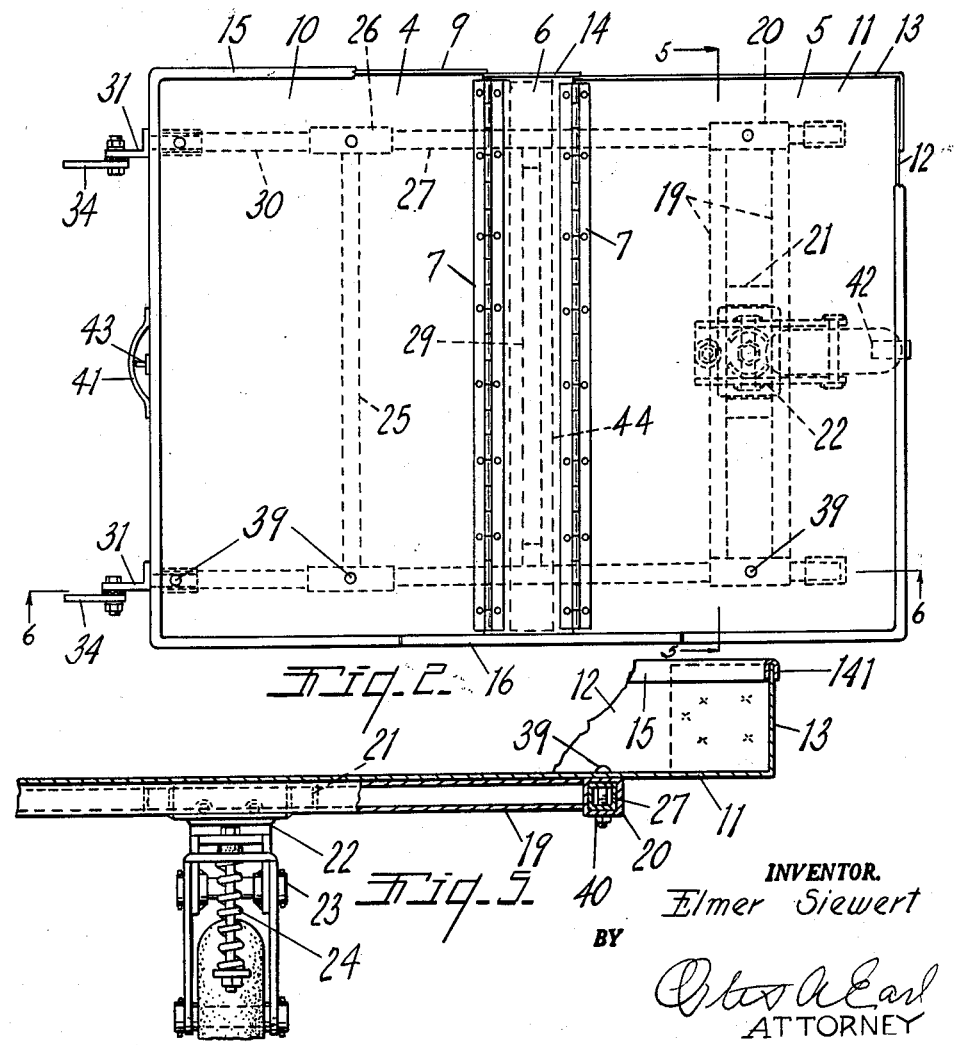
INVENTOR.
Elmer Siewert
BY
ATTORNEY Jan. 15, 1963   E. SIEWERT   3,073,615
COLLAPSIBLE TRAILER
Filed Sept. 18, 1961   2 Sheets-Sheet 2
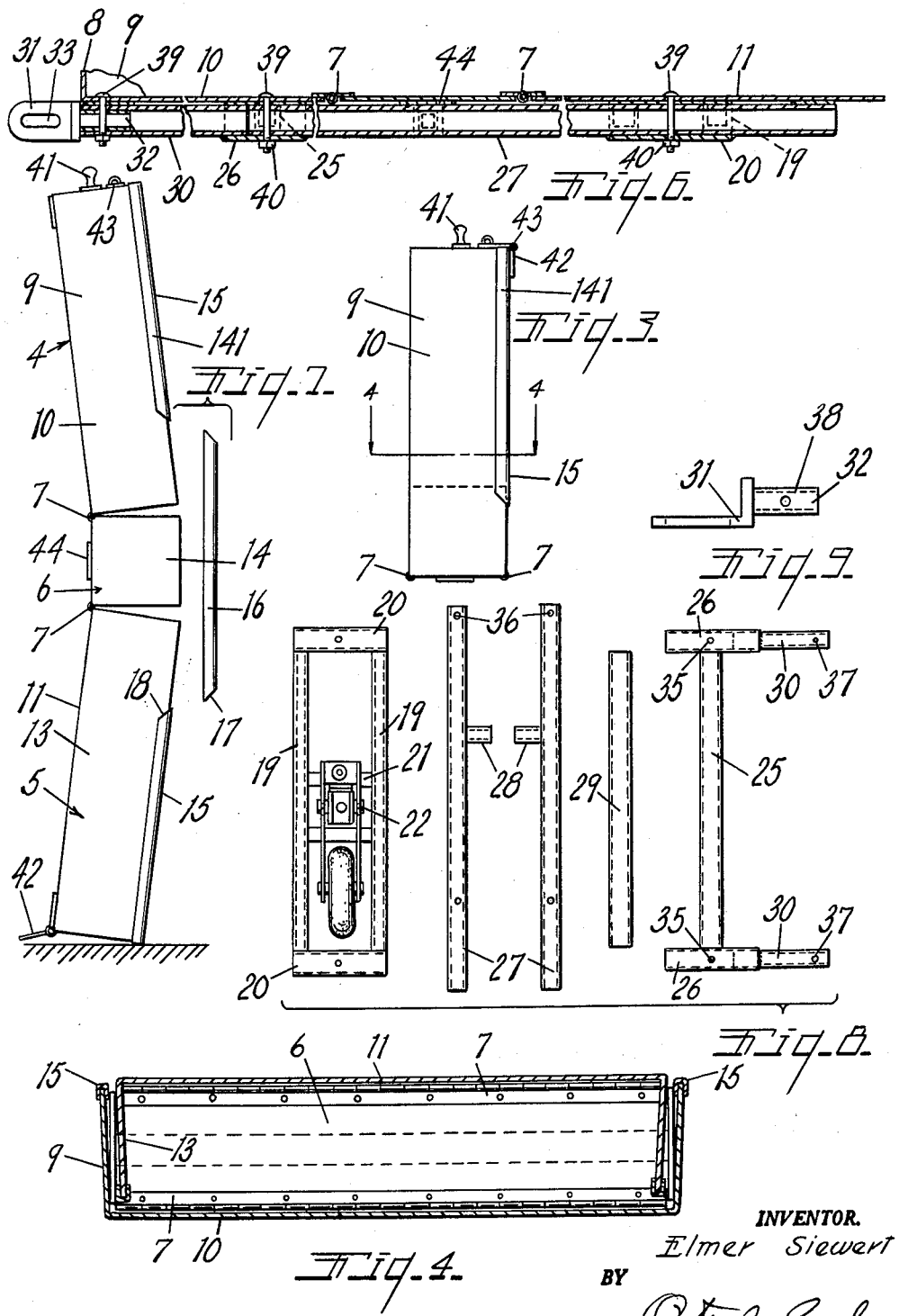
INVENTOR.
Elmer Siewert
BY
Otto A. Earl
ATTORNEY.

United States Patent Office 3,073,615
Patented Jan. 15, 1963

3,073,615
COLLAPSIBLE TRAILER
Elmer Siewert, Sunfield, Mich., assignor to Triplex Engineering Company, Sunfield, Mich.
Filed Sept. 18, 1961, Ser. No. 138,719
14 Claims. (Cl. 280—37)

This invention relates to improvements in collapsible trailer. The principal objects of this invention are:

First, to provide a collapsible trailer of substantial carrying capacity which may be collapsed for carrying or shipment or storage and one which, when erected, is substantially rigid.

Second, to provide a collapsible trailer which, having these advantages, may be quickly set up for use as a trailer and quickly collapsed.

Third, to provide a collapsible trailer comprising a collapsible body member which constitutes a container when collapsed, and a supporting frame the elements of which may be packaged within the collapsed body member.

Objects relating to details and economies of the invention will appear from the description to follow. The invention is defined and pointed out in the claims.

A preferred embodiment of the invention is illustrated in the accompanying drawing, in which:

FIG. 1 is a side elevational view of a trailer embodying my invention, a portion of the rear end of a car to which the trailer is connected being conventionally illustrated.

FIG. 2 is a plan view of the trailer detached from the vehicle, the frame being indicated by dotted lines; portions of the rim being omitted.

FIG. 3 is an end view of the body unit of my trailer in collapsed position.

FIG. 4 is an enlarged cross sectional view on a line corresponding to line 4—4 of FIG. 3, no parts of the frame being illustrated.

FIG. 5 is an enlarged fragmentary transverse section on a line corresponding to line 5—5 of FIG. 2.

FIG. 6 is an enlarged fragmentary longitudinal section on a line corresponding to line 6—6 of FIG. 2, the bolts for connecting the body to the frame being shown in full lines as is also one of the coupling members.

FIG. 7 is a side view of the body member partially in erected postion with one of the intermediate rim members in disengaged position.

FIG. 8 is a view of the frame members is disassembled relation.

FIG. 9 is a plan view of one of the coupling members.

In the accompanying drawing, 1 represents the body portion of a motor vehicle, 2 the rear bumper thereof, projecting from which is a pair of coupling members 3 which in the embodiment illustrated are fixedly connected to the bumper.

The embodiment of my invention illustrated includes a front member 4, rear member 5 and intermediate member 6. These members 4, 5 and 6 may desirably be formed of sheet metal and the members 4 and 5 are hingedly connected to the intermediate member 6 by the hinges 7 of the multiple knuckle type, the hinges being disposed on the inner sides of the members as shown in FIG. 2.

The front member 4 is provided with a front wall 8, see FIG. 6, and side wall sections 9 desirably formed integrally with the bottom 10. The rear section comprises the bottom 11, rear wall 12 and side walls 13. The intermediate member is provided with side wall sections 14. The side wall sections are complementary, see FIGS. 1 and 2.

The front and rear walls and portions of the side walls are provided with rim members 15 of inwardly facing channel section embracing their upper edges, see FIG. 2. The front and rear wall portions of these rim members are integral with the side wall portions thereof and they act to provide bracing means as well as to cover the upper edges.

The side portions 141 of these rim members 15 terminate in spaced relation to the hinges 7. The intermediate rim members 16 are also of inwardly facing channel section and have beveled ends 17 which interlockingly engage with the corresponding beveled ends 18 of the side wall rim sections 141 when the body member is in fully erected position, see FIG. 1. The intermediate rim members 16 also serve as supporting members for the side walls portions of the intermediate body member.

With the sections thus formed and operatively connected they may be formed of relatively light stock and at the same time are strong and rigid when erected to use position. These parts in use however are reinforced and supported by a frame which is detachably secured thereto to permit collapsing of the parts for handling, storage or transportation.

This frame in the desirable embodiment of my invention illustrated comprises a rear frame member including laterally spaced cross members 19 fixedly connected at their ends by the tubular coupling members 20 and having spaced crosspieces 21 on which the caster wheel unit 22 is detachably mounted.

The details of this caster unit are not illustrated and described as such details do not form part of this invention.

The caster wheel is pivoted at 23 and provided with shock absorbing springs 24. The front cross member 25 is provided with tubular coupling members 26 at its ends aligned with the coupling members of the cross members 19. The longitudinal members 27 are telescopingly engaged with these coupling members 20 and 26 when the structure is assembled, see FIG 6. The members 27 are provided with similarly projecting opposed lugs 28 with which the cross bar 29 disposed below the intermediate body member is telescopingly engaged when the frame is assembled.

The relationship of these parts to each other and to the body members is illustrated in dotted lines in FIG. 2.

The front longitudinal members 30 are telescopingly engaged with the coupling members 26. Draft members 31 are provided with coupling sockets 32 which telescope into the front ends of the frame members 30. These coupling members are provided with slots 33 with which the members 34 are engaged, these members 34 being adjustably mounted on the brackets 3. Particular details of that adjustment are not illustrated as they form no part of this present invention.

The coupling members 26 are provided with fastener or bolt receiving holes 35 and the longitudinal members 27 are provided with bolt holes 36 registering with the holes 35 when parts are assembled. The members 30 are provided with bolt holes 37 which register with the bolt holes 38 in the coupling members 31.

When parts are assembled the corresponding holes register to receive the attaching bolts 39, which are common bolts of desired length and desirably inserted downwardly from the inside of the body member, the nuts 40 being on the underside of the assembly.

With this arrangement, only six bolts are necessary. When the parts are disassembled, these detachable parts may be placed in the body member adjusted to serve as a container.

The front body member is provided with a handle 41 and the rear body member with a latch 42 engageable with the staple-like keeper 43 on the front body member. A padlock may be used to secure the parts in locked position.

The rear body member is proportioned so that it collapses within the front body member with the end walls of the intermediate member between the side walls of the front and rear body members, see FIG. 4.

A reinforcing strip 44 is provided for the intermediate body member as it is subjected to considerable load when the disassembled parts are placed within the body member. However, the entire structure is relatively light in weight even though of substantial size. Of course it will be appreciated that the weight varies with the material used and the overall size.

I have illustrated and described my invention in a highly practical embodiment thereof. I have not attempted to illustrate or describe other modifications or embodiments which I contemplate as I believe this disclosure will enable those skilled in the art to embody or adapt the same to meet particular sizes in use requirements.

Having thus described the invention, what is claimed as new and desired to secure by Letters Patent is:

1. A collapsible trailer comprising a body including hingedly connected front, intermediate and rear members, the front member having a front wall and side wall sections, the rear member having a rear wall and side wall sections, the intermediate body member being of approximately the width of the side walls of said front and rear members and having side wall sections of corresponding width, the side wall sections of said front, intermediate and rear members being complementary when the body is in erected position, the rear member being dimensioned so that its walls are collapsible within the walls of the front member with the wall sections of the intermediate member therebetween, rim members of inwardly facing channel section fixedly secured to the side walls of said front and rear members with their inner ends terminating in spaced relation to the inner ends of the walls, intermediate rim members of inwardly facing channel section removably engageable with the walls of said front, intermediate and rear members in complementary relation to the rim members secured to said front and rear body members' side walls with their ends in interlocking engagement therewith when the body members are in erected position, a frame comprising a rear cross member including laterally spaced cross members and tubular couplings fixedly secured thereto, a front cross member having tubular couplings fixedly secured thereto, longitudinal members telescopingly and detachably engaged with said coupling members on said cross members and having aligned lugs on the inner sides thereof disposed below said intermediate body member, a cross bar in supported engagement with said lugs disposed below said intermediate body member, front longitudinal members telescopingly engaged with said tubular couplings on said front cross member, draft members telescopingly engaged with the front ends of said front longitudinal members, a caster wheel unit detachably mounted on said rear cross member, and means for detachably securing said front and rear body members to said frame engaged with said couplings thereof, and means for securing said draft members with said front longitudinal members and with said front body member.

2. A collapsible trailer comprising a body including hingedly connected front, intermediate and rear members, the front member having a front wall and side wall sections, the rear member having a rear wall and side wall sections, the intermediate body member being of approximately the width of the side walls of said front and rear members and having side wall sections of corresponding width, the side walls sections of said front, intermediate and rear members being complementary when the body is in erected position, the rear member being dimensioned so that its walls are collapsible within the walls of the front member with the wall sections of the intermediate member therebetween, a frame comprising a rear cross member including laterally spaced cross members and tubular couplings fixedly secured thereto, a front cross member having couplings fixedly secured thereto, longitudinal members telescopingly and detachably engaged with said coupling members on said cross members and having aligned lugs on the inner sides thereof disposed below said intermediate body member, a cross bar in supported engagement with said lugs disposed below said intermediate body member, front longitudinal members telescopingly engaged with said couplings on said front cross member, draft members telescopingly engaged with the front ends of said front longitudinal members, a caster wheel unit detachably mounted on said rear cross member, and means for detachably securing said front and rear body members to said frame engaged with said couplings thereof, and means for securing said draft members with said front longitudinal members and with said front body member.

3. A collapsible trailer comprising a body including hingedly connected front, intermediate and rear members, the front member having a front wall and side wall sections, the rear member having a rear wall and side wall sections, the intermediate body member being of approximately the width of the side walls of said front and rear members and having side wall sections of corresponding width, the side walls sections of said front, intermediate and rear members being complementary when the body is in erected position, the rear member being dimensioned so that its walls are collapsible within the walls of the front member with the wall sections of the intermediate member therebetween, rim members of inwardly facing channel section fixedly secured to the side walls of said front and rear members with their inner ends terminating in spaced relation to the inner ends of the walls, intermediate rim members of inwardly facing channel section removably engageable with the walls of said front, intermediate and rear members in complementary relation to the rim members secured to said front and rear body members side wall with their ends in interlocking engagement therewith when the body members are in erected position, a frame comprising a rear cross member including laterally spaced cross members and tubular couplings fixedly secured thereto, a front cross member having couplings fixedly secured thereto, longitudinal members telescopingly and detachably engaged with said coupling members on said cross members and having aligned lugs on the inner sides thereof disposed below said intermediate body member, a cross bar in supported engagement with said lugs disposed below said intermediate body member, front longitudinal members telescopingly engaged with said couplings on said front cross member, a caster wheel unit detachably mounted on said rear cross member, and means for detachably securing said body members to said frame.

4. A collapsible trailer comprising a body including hingedly connected front, intermediate and rear members, the front member having a front wall and side wall sections, the rear member having a rear wall and side wall sections, the intermediate body member being of approximately the width of the side walls of said front and rear members and having side wall sections of corresponding width, the side walls sections of said front, intermediate and rear members being complementary when the body is in erected position, the rear member being dimensioned so that its walls are collapsible within the walls of the front member with the wall sections of the intermediate member therebetween, a frame comprising a rear cross member including laterally spaced cross members and tubular couplings fixedly secured thereto, a front cross member having couplings fixedly secured thereto, longitudinal members telescopingly and detachably engaged with said coupling members on said cross members and having aligned lugs on the inner sides thereof disposed below said intermediate body member, a cross bar in supported engagement with said lugs disposed below said intermediate body member, front longitudinal members telescopingly engaged with said couplings on said front cross member, a caster wheel unit detachably mounted on said rear cross member, and means for detachably securing said body members to said frame.

5. A collapsible trailer comprising a body including hingedly connected front, intermediate and rear members, the front member having a front wall and side wall sections, the rear member having a rear wall and side wall sections, the intermediate body member being of approximately the width of the side walls of said front and rear members and having side wall sections of corresponding width, the side walls sections of said front, intermediate and rear members being complementary when the body is in erected position, the rear member being dimensioned so that its walls are collapsible within the walls of the front member with the wall sections of the intermediate member therebetween, rim members of inwardly facing channel section fixedly secured to the side walls of said front and rear members with their inner ends terminating in spaced relation to the inner ends of the walls, intermediate rim members of inwardly facing channel section removably engageable with the walls of said front, and intermediate and rear members in complementary relation to the rim members secured to said front and rear body members side wall with their ends in interlocking engagement therewith when the body members are in erected position.

6. A collapsible trailer comprising a body including hingedly connected front, intermediate and rear sections, the front member having a front wall and side wall sections, the rear member having a rear wall and side wall sections, the intermediate member being of approximately the width of the walls of said front and rear members and having side wall sections complementing the side wall sections of said front and rear members when the body member is erected, rim members secured to the front and rear wall members with their inner ends terminating in spaced relations to the inner ends of the walls, intermediate rim members removably engageable with the walls of said front, intermediate and rear members in complementary relation to the rim members thereof and retainingly interlocked therewith when the body members are in erected position, a frame comprising a rear cross member having couplings secured thereto, a front cross member having couplings secured thereto, longitudinal members detachably engageable with said couplings on said cross members, a cross member disposed below said intermediate body member and supportedly engageable with said longitudinal members, draft members connected to said longitudinal member, a wheel unit detachably mounted on said rear cross member, means for detachably securing said front and rear body members to said frame, said front and rear and intermediate body members constituting a receptacle when in collapsed position, said frame members being dimensioned to be positioned within said receptacle when they are disassembled, one of said body members being provided with a handle at its outer end and means for connecting said front and rear body members in collapsed container forming position.

7. A collapsible trailer comprising a body including hingedly connected front, intermediate and rear sections, the front member having a front wall and side wall sections, the rear member having a rear wall and side wall sections, the intermediate member being of approximately the width of the walls of said front and rear members and having side wall sections complementing the side wall sections of said front and rear members when the body member is erected, a frame comprising a rear cross member having couplings secured thereto, a front cross member having couplings secured thereto, longitudinal members detachably engageable with said couplings on said cross members, a cross member disposed below said intermediate body member and supportedly engageable with said longitudinal members, draft members connected to said longitudinal member, a wheel unit detachably mounted on said rear cross member, means for detachably securing said front and rear body members to said frame, said front and rear and intermediate body members constituting a receptacle when in collapsed position, said frame members being dimensioned to be positioned within said receptacle when they are disassembled, one of said body members being provided with a handle at its outer end and means for connecting said front and rear body members in collapsed container forming position.

8. A collapsible trailer comprising a body including hingedly connected front, intermediate and rear sections, the front member having a front wall and side wall sections, the rear member having a rear wall and side wall sections, the intermediate member being of approximately the width of the walls of said front and rear members and having side wall sections complementing the side wall sections of said front and rear members when the body member is erected, rim members secured to the front and rear wall members with their inner ends terminating in spaced relation to the inner ends of the walls, and intermediate rim members removably engageable with the walls of said front, intermediate and rear members in complementary relation to the rim members secured to said front and rear wall members and retainingly interlocked therewith when the body members are in erected position.

9. A collapsible trailer comprising a body including hingedly connected front, intermediate and rear sections, the front section having a front wall and side wall sections, the rear section having a rear wall and side wall sections, the intermediate member having side walls complementing said wall sections of said front and rear members when said body member is erected, members releasably engageable with said front and rear body members and disposed in bridging relation to said hinge connections for said members and acting to hold said members in erected position, a frame comprising a rear cross member detachably connected to said rear body member, a front cross member detachably connected to said front body member, longitudinal frame members detachably connected to said cross members and extending transversely across said hinge connections for said body members, a cross member disposed below said intermediate body member and detachably connected to said longitudinal members, and a wheel unit detachably mounted on said rear cross member.

10. A collapsible trailer comprising a body including hingedly connected front, intermediate and rear sections, the front section having a front wall and side wall sections, the rear section having a rear wall and side wall sections, the intermediate member having side walls complementing said wall sections of said front and rear members when said body member is erected, members releasably engageable with said front and rear body members and disposed in bridging relation to said hinge connections for said members and acting to hold said members in erected position, a frame comprising a rear cross member detachably connected to said rear body member, a front cross member detachably connected to said front body member, longitudinal frame members detachably connected to said cross members and extending transversely across said hinge connections for said body members, and a wheel unit detachably mounted on said rear cross member.

11. A collapsible trailer comprising a body including hingedly connected front, intermediate and rear sections, the front section having a front wall and side wall sections, the rear section having a rear wall and side wall sections, the intermediate member having side walls complementing said wall sections of said front and rear members when said body member is erected, members releasably engageable with said front and rear body members and disposed in bridging relation to said hinge connections for said members and acting to hold said members in erected position, a frame comprising a rear cross member detachably connected to said rear body member, a front cross member detachably connected to said front body member, longitudinal frame members detachably connected to said cross members and extending transversely across said hinge connections for said body members, a wheel unit detachably mounted on said rear cross member, one of said body members being provided with a handle, and means for connecting said body member in collapsed container forming position.

12. A collapsible trailer comprising hingedly connected front, a rear and intermediate sections having complementary side wall sections, members releasably engageable with side walls of said front and rear members in bridging relation to said hinged connections thereof, a base frame comprising cross members detachably connected to said front and rear body members, longitudinal frame members detachably connected to said cross members and extending transversely across said hinge connections for said body members, and a cross member disposed below said intermediate body member and detachably connected to said longitudinal members.

13. A collapsible trailer comprising hingedly connected front, rear and intermediate sections having complementary side wall sections, members releasably engageable with side walls of said front and rear members in bridging relation to said hinged connections thereof, a base frame comprising cross members detachably connected to said front and rear body members, and longitudinal frame members detachably connected to said cross members and extending transversely across said hinge connections for said body members.

14. A collapsible trailer comprising hingedly connected front, rear and intermediate sections having complementary side wall sections, members releasably engageable with side walls of said front and rear members in bridging relation to said hinged connections thereof, a base frame comprising cross members detachably connected to said front and rear body members, longitudinal frame members detachably connected to said cross members and extending transversely across said hinge connections for said body members, a wheel unit detachably mounted on said frame, said front body member being provided with means for coupling to a controlling vehicle, and means for connecting said front and rear body members in collapsed container forming position.

References Cited in the file of this patent
UNITED STATES PATENTS

| | | |
|---|---|---|
| 1,249,793 | McCauley | Dec. 11, 1917 |
| 1,289,997 | Wyeth | Dec. 31, 1918 |
| 2,693,366 | Randolph | Nov. 2, 1954 |